US006688258B1

United States Patent
Kolesar (10) Patent No.: US 6,688,258 B1
(45) Date of Patent: Feb. 10, 2004

(54) TREAT DISPENSING PET TOY AND TRAINING DEVICE

(76) Inventor: Susan L. Kolesar, 129 Orion Rd., Piscataway, NJ (US) 08854

( * ) Notice: Subject to any disclaimer, the term of this patent is extended or adjusted under 35 U.S.C. 154(b) by 0 days.

(21) Appl. No.: 10/406,858

(22) Filed: Apr. 4, 2003

Related U.S. Application Data
(60) Provisional application No. 60/433,481, filed on Dec. 14, 2002.

(51) Int. Cl.[7] .............................................. A01K 29/00
(52) U.S. Cl. ...................................... 119/710; 711/702
(58) Field of Search ............................. 119/51.01, 702, 119/709, 710, 711, 708, 707; D30/133

(56) References Cited

U.S. PATENT DOCUMENTS

| 3,459,158 A | * | 8/1969 | Mitchell, Jr. ................. 119/708 |
| 3,727,583 A | * | 4/1973 | Muraro ........................ 119/711 |
| 3,830,202 A | * | 8/1974 | Garrison ...................... 119/709 |
| 5,092,272 A | | 3/1992 | O'Rourke ..................... 119/29 |
| 5,148,770 A | * | 9/1992 | O'Rourke ..................... 119/709 |
| 5,174,243 A | * | 12/1992 | O'Rourke ..................... 119/709 |
| 5,499,403 A | | 3/1996 | Harrigan ....................... 2/247 |
| 5,553,570 A | | 9/1996 | VanNatter, III et al. ..... 119/709 |
| 5,560,320 A | * | 10/1996 | Plunk .......................... 119/709 |
| 5,706,762 A | * | 1/1998 | Dokken ....................... 119/712 |
| 5,813,366 A | | 9/1998 | Mauldin, Jr. ................. 119/710 |
| 5,819,690 A | | 10/1998 | Brown ......................... 119/707 |
| 5,957,082 A | * | 9/1999 | Budman et al. .............. 119/54 |
| 6,050,224 A | * | 4/2000 | Owens ......................... 119/710 |
| 6,098,571 A | | 8/2000 | Axelrod et al. .............. 119/707 |
| 6,158,391 A | | 12/2000 | Simonetti ..................... 119/707 |
| 6,237,538 B1 | * | 5/2001 | Tsengas ....................... 119/707 |
| 6,484,671 B2 | * | 11/2002 | Herrenbruck ................ 119/707 |
| 6,490,998 B1 | * | 12/2002 | Rocher ......................... 119/707 |
| 6,601,539 B1 | * | 8/2003 | Snook .......................... 119/710 |

\* cited by examiner

Primary Examiner—Charles T. Jordan
Assistant Examiner—Judith A. Nelson
(74) Attorney, Agent, or Firm—Walter J. Tencza, Jr.

(57) ABSTRACT

An apparatus for dispensing items of food to pets is disclosed comprising a container and a cord. The container has a first opening through which the cord is inserted. The container has a chamber in which at least one item of food can be placed. The first opening of the container is large enough to allow the at least one item of food to pass through the first opening while the cord is in the first opening of the container. The first opening may be located at a first end of the container and the cap portion may be located at a second end of the container. The cap portion can be removed to allow insertion of one or more items of food into the chamber of the container through a second opening of the container. A method is also provided comprising inserting a cord through a first opening of a container so that the cord lies partially in a chamber of the container, placing an item of food into the chamber; and preventing the cord from coming completely out of the container.

25 Claims, 6 Drawing Sheets

TREAT DISPENSING PET TOY AND TRAINING DEVICE

CROSS REFERENCE TO RELATED APPLICATIONS

This application claims the priority benefit of Provisional Patent Application Serial No. 60/433,481, filed Dec. 14, 2002, by the present inventor.

FIELD OF THE INVENTION

This invention relates to improved methods and apparatus concerning pet toys and training devices.

BACKGROUND OF THE INVENTION

There are numerous pet toys in the prior art for the amusement, exercise, training and stimulation of the user. Unfortunately, the majority of them provide only a limited amount of sensory stimulation and therefore, the pet grows tired of the toy quickly and it loses its appeal. This problem was acknowledged and addressed in U.S. Pat. No. 6,484,671, in which Herrenbuck stated, "There are a number of amusement devices and toys in the prior art for entertaining and stimulating their users, often pets or children. Some toys are designed to stimulate the user, be that user a pet or a child, by emitting sounds. For example, U.S. Pat. No. 5,375,839 discloses an impact sensitive talking ball that emits a message when the ball is hit or bounced. Other toys are designed to dispense desired objects, such as pet treats. U.S. Pat. No. 6,098,571 provides an example of such a device. The device disclosed in that patent provides an inner housing that is movable within an outer housing. As the device is motioned by a pet, the device delivers treats placed in the inner housing through openings associated with the outer housing. These devices in the prior art, however, provide only limited stimulation. A device might provide an audio-based stimulation that is designed to engage a user's attention. Another device may attract a user's attention by delivering treats when the device is used. Such limited stimulation reduces the likelihood that a user, such as a pet, will be sufficiently interested in the toy to use it as intended." It is for this reason, as well as others which I will address later, that I agree with Herrenbuck that pet toys must utilize a multi-sensory approach if they are to maintain the pet's interest for an extended period of time. Ideally, a toy should appeal to all five of the pet's senses, the senses of hearing, seeing, smelling, feeling, and tasting. However, U.S. Pat. No. 6,484,671 has faults itself. For example, like U.S. Pat No. 6,158,391, another treat dispensing pet toy, the pet is limited in the way it can interact with the toy. Neither comprises a handle or rope by which the pet can manipulate or carry the toy from one place to another. Aside from dispensing treats, they virtually are of little use or serve little purpose to the pet because of this limitation. When the last treat has been dispensed, it is unlikely the toy will remain of interest to the pet much longer. In addition, the lack of a handle or rope limits the toy's use as an interactive toy that can be used by the pet with its owner for play, training, or exercise. For example, if the owner wants to play tugging games with the pet, there is no place for either of them to latch or grab on to. Tugging games are a favorite among pets, especially dogs. They provide exercise, interaction with their owner, competition, and an opportunity for an owner to train a pet to release the item on which it is tugging with a command such as "release" or "leave it". Another example of this would be if the owner wanted to interact with the pet through playing or exercising his pet with a game of fetch, or to train the pet to retrieve the toy and return it to him. Unfortunately, as mentioned above, because there is no handle or rope by which the pet can easily move these toys, it would be difficult at best to use either of those toys for such purposes.

Providing treats to a pet for desired behavior during play or training is a powerful means of positive reinforcement. Ideally, a treat dispensing toy, when utilized for training purposes, would house the treats that could be removed easily and quickly by the owner and given to the pet as a reward immediately after the behavior is exhibited. It is well known that a positive reward must be given to a pet within a few seconds of performing a desired command or trick in order to perpetuate this behavior. A common means of storing treats is in a pants pocket so that they are close at hand and out of the pet's reach. This method tends to be very messy because crumbs from the treats remain in the pocket. It is also difficult to remove the treats quickly from a pocket, especially if the owner is playing in a seated position. Although treat bags on the market, such as the "Treat Tote" by Canine Hardware Inc. have tried to remedy this problem, they have not fully succeeded. This is because most treat bags must be connected to a belt. If the owner did not want to wear a belt or could not wear with the apparel he was wearing, for example, a pair of sweat pants or shorts, he would be prohibited from making proper use of this tote and would not receive the intended benefit of the product. This could also happen if the owner was wearing a piece of outerwear that covered the treat bag. It can also be a burden to carry around extra bags of this nature. U.S. Pat. No. 5,499,403 discloses a disposable treat pocket that secures to a person's clothing by adhesive. However, even though this is an improvement over the above mentioned tote, it still requires an owner to bear an extra bag of sorts that can impede movement or be easily knocked off of the body, or the contents accidentally emptied out during play with the pet. Additionally, when a pet or group of pets, such as you would find at a dog park, smells treats from such a tote or pocket, they can pester the owner for treats and become fixated on the treat storage device instead of the toy, training device or the owner. Therefore, the most beneficial option for training is for the toy to actually serve as the treat container. Unfortunately, even if there was a limited way in which the treat dispensing ball toys disclosed in U.S. Pat. No. 6,484,671 and U.S. Pat. No. 6,158,391 could be used for interactive play or training purposes, removal of the treats from within the toy by the owner is difficult at best because the treats within must pass through a plurality of barriers or housing in order to exit the toy.

Another key element to training a pet is the pet's belief that a reward will be given. If the pet actually sees the reward, specifically a treat, he will be more likely to comply with a command given by the owner. Again, because of the plurality of barriers and housings that comprise the above referenced treat dispensing toys, the pet will not readily see the treats contained in them. U.S. Pat. No. 6,098,571 discloses a treat dispensing toy that addresses the need for pet and the pet owner to more easily see the contents. It is claimed that the inner housing of this pet toy is translucent or transparent. However, this toy again, like the prior art mentioned above, does not contain a rope or handle by which the pet can maneuver the toy. Also mentioned in that patent is a need for improved pet toys that do not require regular and constant actuation by, or the presence of, the pet owner, which toys are based on an efficient and simplified self-regulating mechanical delivery system. This brings us to U.S. Pat. No. 5,553,570, which discloses a retrievable animal toy which has a two-part body at least one part of which has at least one hollow portion for holding an item, an animal food item or items and which is not accessible by an animal until released therefrom. One embodiment has a transparent portion, or body so the animal can see the item within the toy. The problem with this toy is that it is designed to prevent the animal from having access to the food items until a person opens the body or releases the item from a holding device. Therefore, the toy can not be used as a treat dispensing toy without interaction from the owner. In addition, it too lacks a rope or handle by which the pet can maneuver the toy.

There are many treat-dispensing rubber chew toys on the market. U.S. Pat. No. 5,813,366 discloses a non-consumable animal toy comprising a three-dimensional body formed of substantially solid resilient material into which a small quantity of animal food or attractant can be placed and be accessible for consumption by the pet. While many of these chew toys are resilient and do not break easily, their usefulness as a treat dispensing toy is limited as they can only hold a small quantity of food, sometimes only one small biscuit. Once the pet has consumed this food item, the pet will loose interest in the toy. Also, it is possible for the pet to bite off a piece of the food item and the other portion can remain stuck in the toy. This can be very frustrating for the pet since it can be impossible for him to get the food out with his paws or mouth.

Aside from treat dispensing toys, rope tug toys are popular as well. They provide an excellent means of exercise and interaction between the pet and owner. U.S. Pat. No. 5,092,272 discloses one such toy. It is a therapeutic animal tug toy comprising a length of cotton rope which is woven so as to define a closed loop handle, a shaft portion extending from the loop handle and a pair of tail portions extending from the shaft portion. The tail portions each define a knot therein proximate their extended ends. However, the problem I see with this toy, as well as any other rope toy with loose tail threads, is that the threads easily become detached when the pet chews on them. This can lead to choking or digestive problems in the pet if he swallows too many of them. Additionally, rope toys such as this one offer very little sensory stimulation to the pet.

Chew toys offer therapeutic benefits to the oral health of dogs and satisfy their basic urge to chew. However, many chew toys, especially those of vinyl, are easily destroyed by pets since they are collapsible. Pieces can be bitten off and swallowed causing a safety hazard and rendering the toy useless. Many vinyl chew toys have painted surfaces for decoration. When used for fetching games within a home environment, the paint from the toy can mark walls and floors. This is another disadvantage.

SUMMARY OF THE INVENTION

The present invention in one or more embodiments provides a pet food dispensing apparatus comprising a container and a cord. The container may have a first opening through which the cord is inserted; and the container may have a chamber in which at least one item of food can be placed. The first opening of the container may be large enough to allow the at least one item of food to pass through the first opening while the cord is in the first opening of the container.

The container may include a first end, at which the first opening is located, and a second end at which a cap or cap portion is located. The cap portion can be removed to allow insertion of one or more items of food into the chamber of the container through a second opening of the container. The second opening may be larger than the first opening. The cord may be a rope. The cord may have a first end having a stopper, which is larger than the first opening and which prevents the cord from completely falling out of the container through the first opening. The stopper may be a knot in the cord. The cord may have a second end having a handle. The handle may be a loop.

The container may include a neck portion which may include a covering. The covering may be comprised of rubber and may be comprised of a plurality of protruding bumps.

The present invention in one or more embodiments may include a method comprising the steps of inserting a cord through a first opening of a container so that the cord lies partially in a chamber of the container, placing an item of food into the chamber of the container; and preventing the cord from coming completely out of the container.

Several objects of the present invention in one or more embodiments are as follows.

It is an object of the present invention to provide a pet toy that utilizes a multi-sensory approach to keep the pet interested and motivated to use the toy. The pet toy provided may appeal to the pet's senses of touch, smell, taste, sight, and hearing.

It is an object of the present invention to provide a safe and durable pet toy in which parts will not be easily removed or broken by the pet.

It is an object of the present invention to provide an interactive toy which can be used by the owners for playing with their pet for games such as "fetch" and "tug-o-wae".

It is an object of the present invention to provide a toy that the pet will be able to use without interaction from the owner.

It is a further object of the present invention to provide an interactive toy which can be used as a training tool for commands such as "fetch", "bring it", and "leave it".

It is a further object of the present invention to provide a toy which involves positive reinforcement through the dispensing of treats, food items, or pet food from within the toy by the owner in a quick and easy manner.

It is an additional object of the present invention to provide a treat or pet food dispensing toy in which the pet actually sees the treats or pet food items.

It is a further object of the present invention to provide a toy from which the pet can obtain treats or pet food items independently.

It is a further object of the present invention to provide a toy with multiple functions such as training, chewing (cleaning teeth), tugging, pulling, and swinging.

It is a further object of the present invention to provide a toy which is non-staining to the environment such as walls and floors.

It is a further object of the present invention to provide a toy that can be manufactured in various sizes for use by various pet breeds, yet still maintain the same purpose and function regardless of size.

It is a further object of the present invention to provide a toy that does not have parts which can be easily removed by the pet and lead to choking or destruction of the toy.

It is a further object of the present invention to provide a toy that stores treats or pet food items instead of storing them in a pocket or treat or pet food item tote.

Further objects and advantages are to provide a lightweight toy without angles or sharp protrusions which can cause injury. In one or more embodiments, since the main plastic container is cylindrical, there are no angles or areas into which the pet can bite. This will preserve the structure and usefulness of the toy and also allow for better movement of the toy as the pet is playing with it. It also reduces the chance of injury to the pet, the owner, and others around the toy as it is being used. The toy can easily be cleaned through the opening in the base of the container. This will allow the owner to keep the toy sanitary.

Still another advantage of the present invention in one or more embodiments over other treat or pet food dispensing toys on the market is that it is likely easier and less expensive to produce since it does not involve a plurality of layers, barriers, deflectors in the container. Instead, the treats simply slide out on their own when the toy is manipulated in a certain way. Also, since, in one or more embodiments, there is only one opening for the treats to exit the container, the toy will present more of a challenge than treat dispensing toys with several openings from which the treats exit the toy. Having only one exit also reduces the amount of small unwanted crumbs that will be deposited on surfaces such as carpets and floors. However, the treats can still easily be removed by the owner upon tipping the container downward. Still further objects and advantages will become apparent from a consideration of the ensuing description and drawings.

DETAILED DESCRIPTION OF THE DRAWINGS

Figure 1:
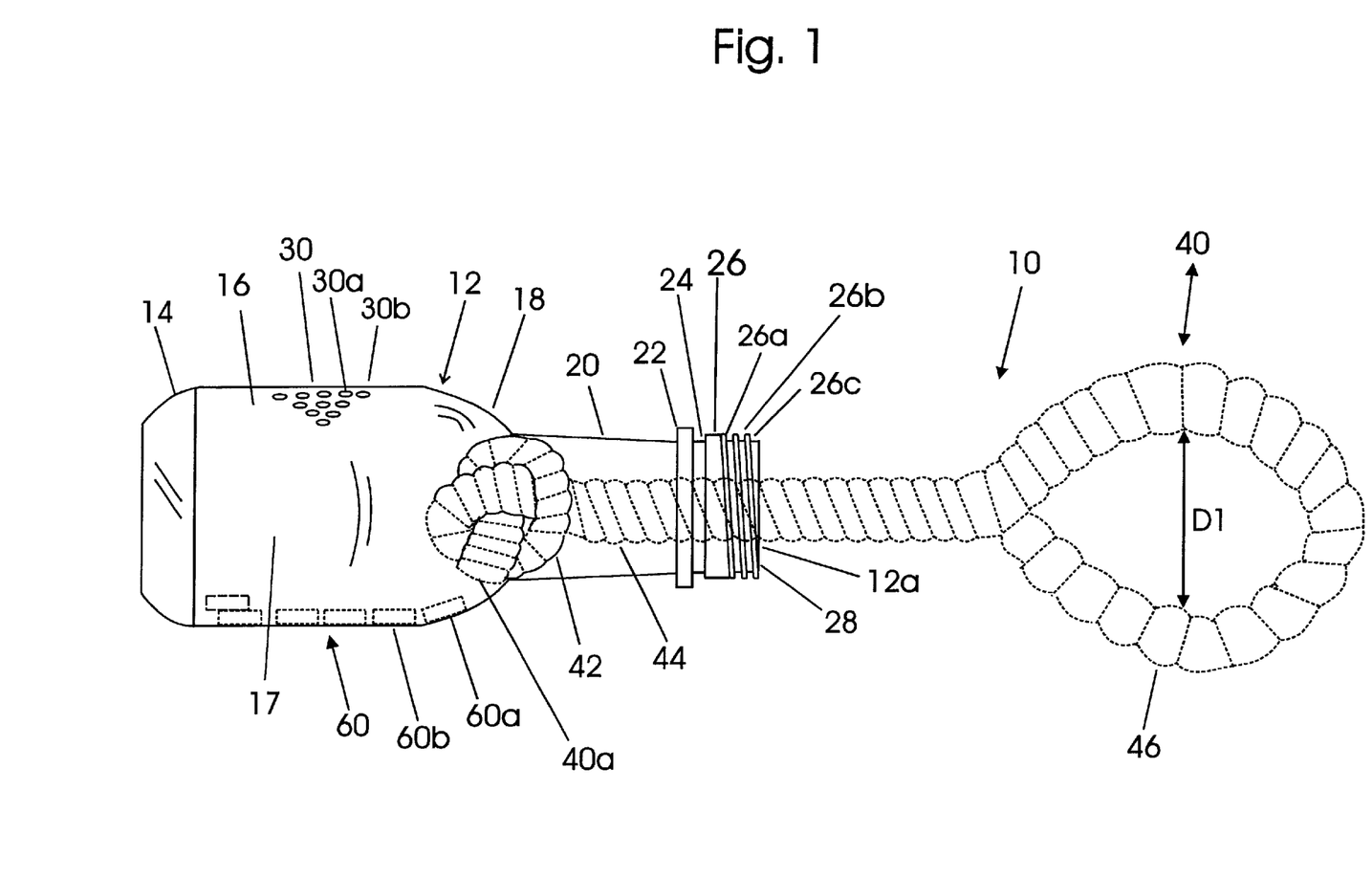
FIG. 1 shows a side view of an apparatus in accordance with a first embodiment of the present invention.

FIG. 1 shows a side view of an apparatus 10 in accordance with a first embodiment of the present invention. The apparatus 10 includes a container 12, a cord or rope 40, and a plurality of pet food items or treats 60.

The container 12 includes a rear cap 14, a substantially cylindrical body portion 16, a narrowing portion 12, a sloped neck portion 20, a rim 22, a portion 24, and a portion 26. The portion 26 may include ridges 26a, 26b, and 26c. The container 12, when the rear cap 14 is connected, attached or screwed onto the body portion 16 is a closed container with the exception of a plurality of small holes 30 and an opening 12a. Each of the plurality of small holes 30 has a diameter which is small enough to prevent any of the plurality of treats 60, such as treats 60a and 60b, from falling through any one of the holes 30 and out of the container 12. The holes 30 may be scent holes which may be used to allow the aroma of treats such as treats 60, to permeate through the container 12, and thus to be smelled by a dog or other pet. The container 12 may be a bottle. The neck portion 20 is typically thinner than the body portion 16. The container 12 may include an inner chamber 17. The inner chamber may be located, at least, inside the body portion 16, and the portions 18 and 20.

The cap 14 may be made of rubber, plastic, or a combination of rubber and plastic.

The rope 40 may include a knot 42, a straight portion 44 and a handle 46. The handle 46 can be in the form of a loop. The knot 42 may be called a stopper or rope retention means and is typically large enough so that the knot 42 cannot be pulled out of the container 12 through the opening 12a. The loop 46 may have an inner diameter of D1, which may be, for example, about two and one half inches.

Figure 6:
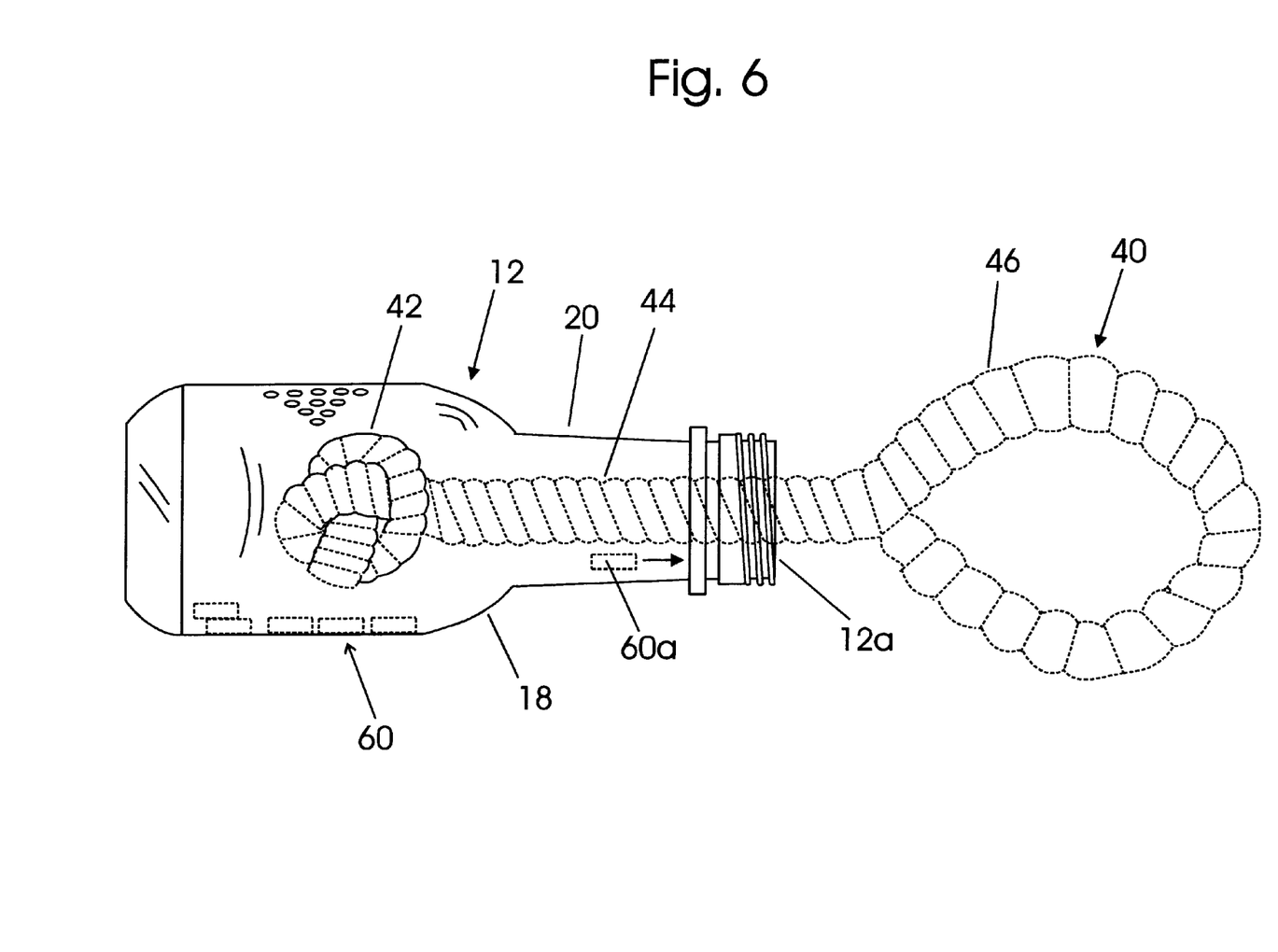
FIG. 6 shows a side view of the apparatus of FIG. 1 where a treat has moved to another location.
Figure 7:
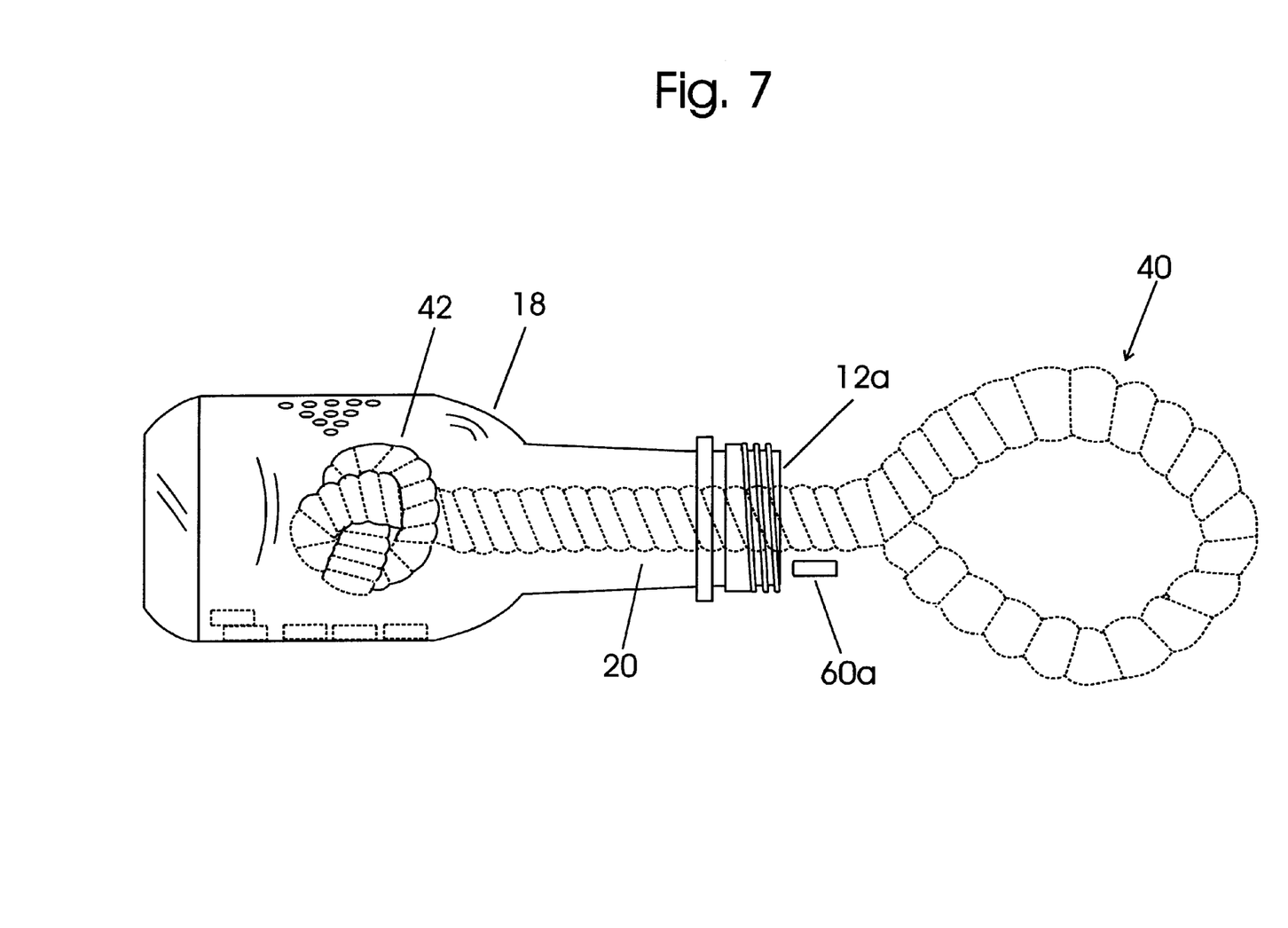
FIG. 7 shows a side view of the apparatus of FIG. 1 where the treat of FIG. 6 has moved out of the container shown in FIG. 1.

The treats 60, may for example, be rectangular or cubed shaped food items or food treats. Each treat, such as treat 60a, may be an item of food, which may for example be cubed shaped with a height, width, and depth of D4, which may be one quarter an inch. Each food item, such as 60a needs to be able to fit through the opening 12a with the straight portion 44 of the rope or cord 40 in the opening 12a as shown by FIGS. 6 and 7.

Figure 2:
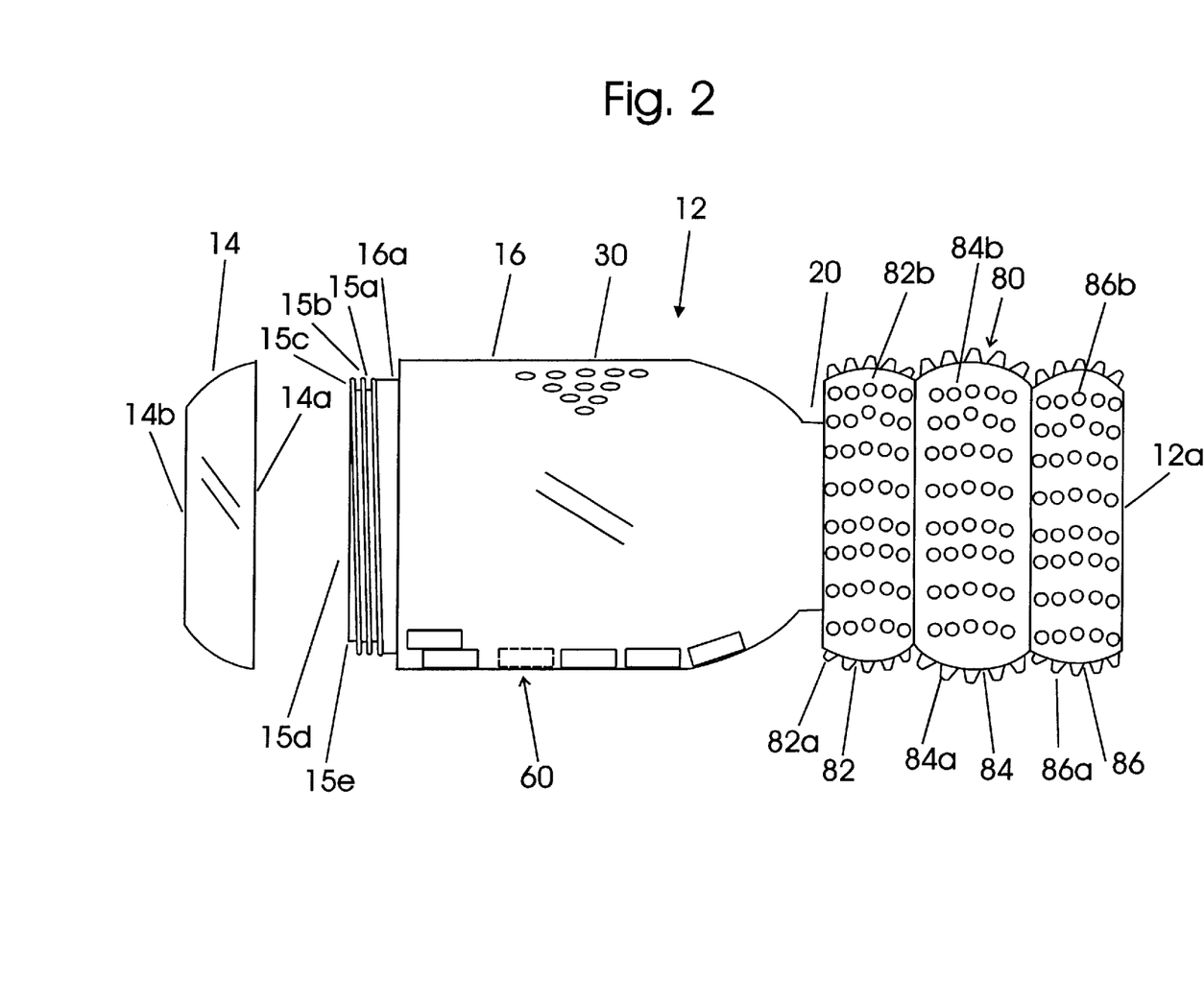
FIG. 2 shows a side view of some of the components of the apparatus of FIG. 1 along with a covering.

FIG. 2 shows a side view of some of the components of the apparatus 10 of FIG. 1 along with a covering 80. The covering 80 is shown fitted onto the neck portion 20 of the container 12. FIG. 2 also shows the rear cap 14 separated or unscrewed from the body portion 16. The body portion 16 may include portion 15 which may be comprised of ridges 15a, 15b, and 15c for screwing onto internal recesses, not shown, at end 14a of rear cap 14. The rear cap 14 has a closed surface 14b. The body portion 16 may also have an opening 15d defined by a rim 15e. The opening 15d is large enough to allow the knot 42 of the rope 40 to be pulled out of the container 12 when the rear cap 14 has been removed as in FIG. 2.

The covering 80 is comprised of portions 82, 84, and 86. The covering 80 may be made of rubber or plastic textured wrap that may serve as both a handle and chewing surface for a pet, such as a dog. Each of the portions 82, 84, and 86 may include a plurality of protruding bumps or ridges. Portion 82 may include bumps or ridges 82a and 82b and further bumps or ridges. Portion 84 may include bumps or ridges 84a and 84b and further bumps or ridges. Portion 86 may include bumps or ridges 86a and 86b and further bumps or ridges. The covering 80 may fit tightly onto the neck portion 20 so that it would be difficult for a dog to remove the covering 80 from off of neck portion 20 of the container 12.

The covering 80 may be provided instead with a smooth texture, instead of with bumps and ridges. The covering 80, in one or more embodiments may not be provided at all.

Figure 3:
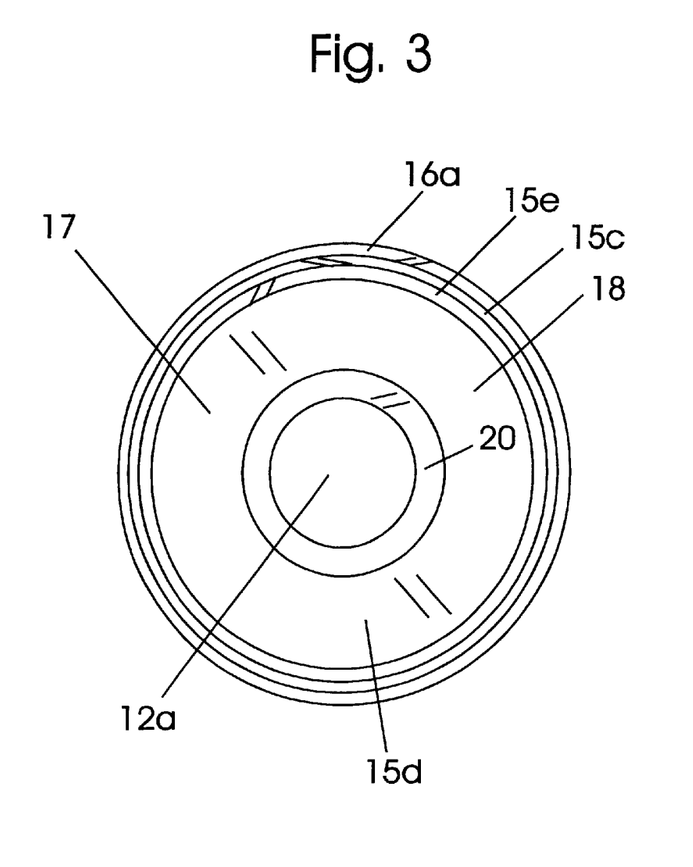
FIG. 3 shows a back view of a container of the apparatus of FIG. 1 with a rear cap removed.

FIG. 3 shows a back view of the container 12 of the apparatus 10 of FIG. 1 with the cap 14 removed. The opening 15d defined by rim 15e can be seen in FIG. 3. The ridge 15c can be seen in FIG. 3. FIG. 3 is a view which is looking into the body portion 16 of the container 12 and into the chamber 17 which is inside the body portion 16. A rim 16a can also be seen in the view of FIG. 3. FIG. 3 also shows the location of opening 12a.

Figure 4:
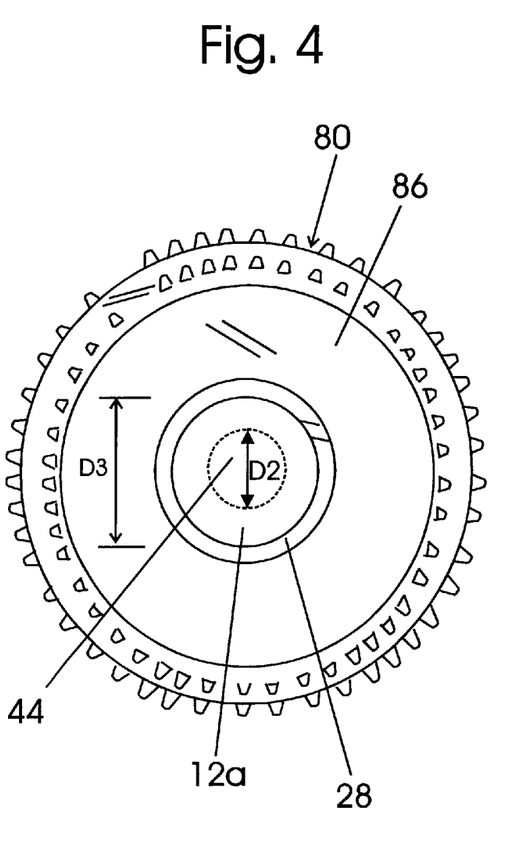
FIG. 4 shows a front view of the container of the apparatus of FIG. 1 with the covering shown on a neck of the container.

FIG. 4 shows a front view of the container 12 of the apparatus 10 of FIG. 1 with the covering 80 shown on the neck portion 20 of the container 12. FIG. 4 also shows the location in dashed lines of the straight portion 44 of the rope 44. The straight portion 44 of the rope 40 may have an approximate diameter of about D2, which may be one half inch. The diameter of the straight portion 44 may be about half of the diameter D3 of the opening 12a of the container 12. The diameter of the straight portion 44 of the rope 40 should be small enough in relation to the diameter D3 of the opening 12a to allow a treat, such as treat 60a, to escape from the container 12 through the opening 12a as will be shown and described with reference to FIGS. 1, 6, and 7.

Figure 5:
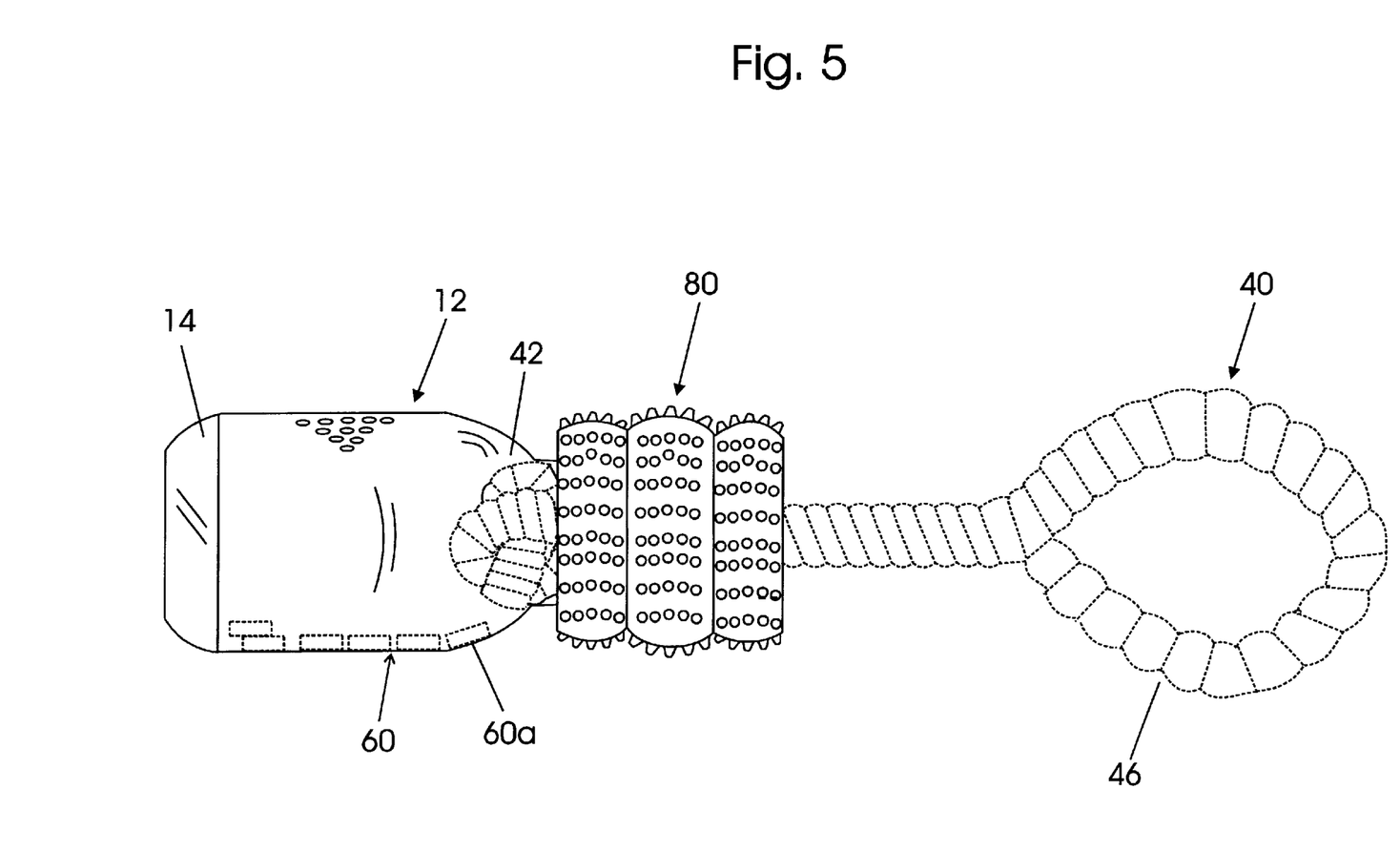
FIG. 5 shows a side view of the apparatus of FIG. 1 along with the covering.

FIG. 5 shows a side view of the apparatus 10 of FIG. 1 along with the covering 80. FIG. 6 shows a side view of the apparatus 10 of FIG. 1 where a treat 60a has moved to another location. FIG. 7 shows a side view of the apparatus 10 of FIG. 1 where the treat 66a of FIG. 6 has moved out of the container 12 shown in FIG. 1. The covering 80 has been left out of FIGS. 6 and 7 for simplification, however, typically the covering 80 would be on the neck portion 20.

In operation, typically, the cap portion 14 would be removed from the container 12. Assuming, that the knot 42 has not yet been tied, i.e. that the rope 40 is at first only comprised of a straight portion and a loop portion 46, end 40a of the rope 40 can be inserted through the opening 12a. After the end 40a gets through the neck portion 20, the knot 42 can be tied or some other stopper can be put on the end 40a of the rope 40 to prevent the end 40a from falling through the opening 12a.

With the rear cap 14 removed, treats 60, such as treats 60a and 60b can be inserted through the opening 15d shown in FIGS. 2 and FIG. 3. The treats 60 are typically inserted so that the fall into the body portion 16, or portion 18, of the container 12 as shown in FIG. 2. With the treats 60 inserted as in FIG. 2, the cap 14 can be attached, connected, or screwed onto the portion 16 to form a closed container 12 (with the exception of opening 12a) as shown in FIG. 1.

The rubber covering 80 may be placed onto the neck portion 20 at this time or some other time, or the rubber covering 80 may be permanently attached to the neck portion 20 of the container 12. FIG. 5 shows a side view of the container 12 with the treats 60 inside the container 12, the knot 42 inside the container 12, and the covering 80 on the neck portion 20 of the container 12.

In order for a pet, for example, to get a treat out of the container 12, the pet may grab the loop 46 of the rope 40 with his or her mouth and shake or otherwise move the rope 40. The shaking of the rope 40 may cause the knot 42 to move within the container 12 and may also cause the treats 60 to move. For example, one of the treats, such as treat 60a may move into the neck portion 20 as shown by FIGS. 5 and 6 and eventually out of the opening 12a and out of the container 12 as shown by FIG. 7. FIG. 6 and FIG. 7 do not show covering 80 for simplification of description. However, the pet could grab the covering 80 with his or her mouth and could also cause the knot 42 to move and the treat 60a to move into the neck portion 20, into the position of FIG. 6, and eventually out of the container 12 through the opening 12a, into the position of FIG. 7.

A person can dispense a treat, such as treat 60a to a pet by moving knot 42 and for example, tilting container 12 to cause the treat 60a to move into the neck portion 20 as in FIG. 6 and then out of the container 12 as in FIG. 7. There may be many ways of getting treats, such as treat 60a, out of the container 12, such as by shaking and/or tilting the container 12 and thereby moving both the knot 42 and the treat 60a.

The container 12, including the rear cap 14, may be made from clear, sturdy, but lightweight plastic.

The rope 40 may be a tightly braided, solid, or multi-colored rope. The loop 46 may be secured by a second knot, not shown, or in any other manner. The loop 46 may be used to prevent the rope 40 from completely falling into the chamber 17 of the container 12 since it is wider than the opening 12a of the container 12. When an owner or pet manipulates the combination of the apparatus 10 and the cover 80, shown in FIG. 5, in such a way that the treats 60, such as treat 60a move into the neck portion 20 of the container 12, the treats 60, such as treat 60a will slide alongside the rope 40 and exit or be dispensed from the container 12. The owner can also manually remove the treats 60 by removing the rubber or plastic cap or plug 14. This cap or plug 14, when inserted properly, can be designed to remain flush with the body portion 16 of the container 12, to prevent the pet from chewing it.

When using this pet toy, comprised of apparatus 10 and covering 80, alone, the pet may pull or swing it around by the rope 40. The pet may also carry the toy in its mouth by biting onto covering 80 that encircles the elongated neck portion 20 of the container 12. The pet may also choose to use this toy for chewing purposes by chewing on the covering 80 or the rope 40. The treat dispensing quality of this toy comes into play when the pet swings the toy by the rope 40 or rolls or manipulates the toy in such a way that the treats exit the container 12 via the elongated neck portion 20 of the container 12 and pass along side the rope 40 that runs through the neck 20 and leaves or exits the container 12 via the first opening 12a. The challenge of the toy, and what will keep the pet interested and motivated to use it, is the positive reward that comes from this treat dispensing quality. In addition, the sound of the treats 60 hitting against one another and hitting the interior of the container 12 produces a rattling sound that appeals to the pet's sense of hearing. Another feature of the toy that will motivate the pet to play is the sight of the treats 60 through the clear container 12. In addition, the pet will probably be most motivated to use the toy because of the smell of the treats 60 through the scent holes 30 that are present in the container 12. There may be another set of scent holes, like scent holes 30. On the other side of the container 12, directly across from the scent holes 30.

This toy, comprised in one or more embodiments of apparatus 10 and covering 80, can also be used as an interactive play toy for both owner and pet for enjoyment and/or training purposes. The owner can play tugging games with the pet by holding on to the container 12 or the rope 40 or loop handle 46 of the rope 40 while the pet holds the opposite part in his mouth. The owner can use this toy for training purposes to teach the pet the command "leave it" in which he wants the pet to release the toy. Each time the pet successfully complies with the command "leave it", the owner can remove a treat, such as treat 60a, from the container 12 by shaking through treat 60a though the elongated neck portion 20 of the container 12 or removing the rear cap or plug 14 from the opening 15d at the base of the body portion 16 of the container 12 and then replace the rear cap or plug 14. The owner can also hold the toy, comprised of apparatus 10 and covering 80, in the air and allow the pet to run and jump for the toy which it can grasp in its mouth by either the rope 40 or the neck portion 20 of the container 12 which is covered by the rubber or plastic textured wrap 80. As a reward for successfully reaching and grasping the toy, the owner can dispense a treat, such as treat 60a, to the pet as noted above. The owner can play or teach the pet to retrieve by throwing the toy, including apparatus 10 and covering 80, and giving the "fetch" command. When the pet returns the toy to the owner with a "bring it" or "come" command, the pet will be rewarded with a treat, such as treat 60a, from the container 12 by the owner as noted above.

Many other tricks can be taught with this toy, comprised of apparatus 10 and covering 80 in one embodiment, because of the reward component involved. Since the pet sees the treats 60 present in the container 12, he or she is more likely to comply with commands or perform tricks than if the treats were stored in the owner's pocket or a treat bag where they were less obvious to the pet.

The description of my invention in one embodiment outlined above is only one way to design this treat dispensing pet toy and training device. However, many modifications can be made that will still allow for the preservation of the original intent, spirit, and purpose of the toy. Some of these modifications are as follows:

The container 12 can be made with a colored opaque plastic or tinted with a color but still remain translucent. The rope 40 may contain a small amount of fringe rather than ending in a knot or have no loop or some other type of handle attached to the rope made of plastic or rubber. The container 12 can be in various shapes and sizes including a ball shape or in the shape of some object such as an animal, car, boat, etc.

The neck portion 20 of the container 12 can be various widths or lengths. The covering 80 that encircles the neck portion 20 of the container 12 can be various colors, textures, or sizes. The rope 40 can be a solid color or have multiple colors. The rope 40 can be of various lengths. Rather than a plug being used for rear cap 14, as a means of sealing off the opening 15d in the base of the body portion 16 of the container 12 through which treats are inserted and/or removed, a plastic door with locking capability could be used and attached using internal hinges within the container 12 or the door could snap in place and be removed from the body portion 16 of the container 12 entirely. These options can be likened to those used in the battery compartments of radios. Both methods would not be able to be opened by the pet, only the owner. Another option includes having no opening in the container 12 aside from the one at the neck portion 20 of the container 12 and having the owner load the treats via that opening 12a by moving the rope 40 to the side and dropping the treats in. This would be the most cost effective method. Another option would be to have the neck portion 20 of the container 12 blocked from within by a rubber or plastic stopper so only the rope 40 may pass and the treats, such as treats 60, cannot, making the only way to have the treats 60 removed from the toy owner initiated.

Scent holes 30 can be omitted and the smell of the treats would only be evident through the opening 12a of the container 12. A toy in accordance with one or more embodiments of the present invention could be marketed with or without treats.

Although the invention has been described by reference to particular illustrative embodiments thereof, many changes and modifications of the invention may become apparent to those skilled in the art without departing from the spirit and scope of the invention. It is therefore intended to include within this patent all such changes and modifications as may reasonably and properly be included within the scope of the present invention's contribution to the art.

I claim:

1. An apparatus comprising:
a container;
a cord;
wherein the container has a first opening through which the cord is inserted; and
wherein the container has a chamber in which at least one item of food can be placed;
and wherein the first opening of the container is large enough to allow the at least one item of food to pass through the first opening while the cord is in the first opening of the container.

2. The apparatus of claim 1 wherein
the container includes a first end and a second end and a cap portion;
wherein the first opening is located at the first end of the container and the cap portion is located at the second end of the container;
and wherein the cap portion can be removed to allow insertion of one or more items of food into the chamber of the container through a second opening of the container.

3. The apparatus of claim 2 wherein
the second opening is larger than the first opening.

4. The apparatus of claim 1 wherein
the cord is a rope.

5. The apparatus of claim 1 wherein
the cord has a first end having a stopper, which is larger than the first opening and which prevents the cord from completely falling out of the container through the first opening.

6. The apparatus of claim 5 wherein
the stopper is a knot in the cord.

7. The apparatus of claim 1 wherein
the cord has a first end having a handle.

8. The apparatus of claim 7 wherein
the handle is a loop.

9. The apparatus of claim 5 wherein
the cord has a second end having a handle.

10. The apparatus of claim 1 further comprising
a covering; and
wherein the container has a neck portion which is covered by the covering.

11. The apparatus of claim 10 wherein
the covering is comprised of rubber.

12. The apparatus of claim 11 wherein
The covering is comprised of a plurality of protruding bumps.

13. A method comprising the steps of:
inserting a cord through a first opening of a container so that the cord lies partially in a chamber of the container;
placing an item of food into the chamber of the container; and
preventing the cord from coming completely out of the container.

14. The method of claim 13 wherein
the first opening of the container is large enough to allow the item of food to pass through the first opening while the cord is in the chamber of the container.

15. The method of claim 14 wherein
the container includes a first end and a second end and a cap portion;
wherein the first opening is located at the first end of the container and the cap portion is located at the second end of the container;
and wherein the cap portion can be removed to allow insertion of one or more items of food into the chamber of the container through a second opening of the container.

16. The method of claim 15 wherein the second opening is larger than the first opening.

17. The method of claim 13 wherein the cord is a rope.

18. The method of claim 13 further comprising providing the cord with a stopper at a first end of the cord;
wherein the stopper is larger than the first opening prevents the cord from completely falling out of the container through the first opening.

19. The method of claim 18 wherein the stopper is a knot in the cord.

20. The method of claim 13 wherein the cord has a first end having a handle.

21. The method of claim 20 wherein the handle is a loop.

22. The method of claim 18 wherein the cord has a second end having a handle.

23. The method of claim 13 further comprising placing a covering on a neck portion of the container.

24. The method of claim 23 wherein the covering is comprised of rubber.

25. The method of claim 23 wherein the covering is comprised of a plurality of protruding bumps.

* * * * *